United States Patent
Rossin

[11] 3,839,640
[45] Oct. 1, 1974

[54] DIFFERENTIAL PYROELECTRIC SENSOR
[76] Inventor: John A. Rossin, 1411 Norman Firestone Rd., Goleta, Calif. 93017
[22] Filed: June 20, 1973
[21] Appl. No.: 371,945

[52] U.S. Cl.................. 250/353, 136/213, 250/342
[51] Int. Cl............................................... G01t 1/16
[58] Field of Search........... 250/338, 340, 342, 349, 250/353; 136/213

[56] References Cited
UNITED STATES PATENTS

| | | | |
|---|---|---|---|
| 3,453,432 | 7/1969 | McHenry | 250/338 |
| 3,480,777 | 11/1969 | Astheimer | 250/349 |
| 3,581,092 | 5/1971 | Pearsall et al. | 250/349 |
| 3,631,434 | 12/1971 | Schwartz | 250/349 |

*Primary Examiner*—James W. Lawrence
*Assistant Examiner*—Davis L. Willis
*Attorney, Agent, or Firm*—Evert Allen Autrey

[57] ABSTRACT

A low cost mass produced intrusion detection device which responds to a temperature difference between ambient temperature and the body temperature of an intruder who is moving past the sensor. The combination of body temperature and movement will unbalance the differential sensor to thereby trigger an alarm. This sensor utilizes a pyroelectric plastic film as the active element. It is not affected by ambient heat. Only a moving person or object can be detected to sound an alarm.

11 Claims, 15 Drawing Figures

PATENTED OCT 1 1974　　　　　　　　　　　　　　3,839,640

DIFFERENTIAL PYROELECTRIC SENSOR

BACKGROUND

Intrusion detection devices have been known for many years. Most such devices have utilized various light beams both visible and invisible to trigger photocells. Other means have been the use of ultra-sonic sound and the use of purely mechanical switching means which operate to make or to break an electrical circuit to sound an alarm. Less common has been the use of infra-red heat energy because of the relatively complicated and costly apparatus needed for operation. This present invention is an advancement in the art of infra-red devices in that for the first time reliability, simplicity and ample sensitivity can be achieved at a low cost.

This invention is based on the use of a miniature piece of ultra-thin pyroelectric plastic film as an infra-red sensor. Because of the manner in which this film is fabricated this invention provides high efficiency in the conversion of infra-red energy into a substantial electrical signal.

SUMMARY

This present invention utilizes the phenonema known as the pyroelectric effect to generate an electrical signal in response to the temperature of an intruder's body heat. This pyroelectric electrical voltage is generated in a small sensor having two sensitive areas which are made of an electrically conductive paint applied to both front and rear sides of a microthin polyvinylidene fluoride plastic film. The active area of the sensor with its two sensitive areas is only about ¼ inch square. The plastic film is only about 6 microns thick and weighs only a few micrograms.

By the use of a concave front surfaced mirror reflector the image of an intruder's body is focused and concentrated on one or the other of the two sensitive areas of the sensor to thus generate an electrical voltage signal. A time element is also involved in this sensor in that any slowly changing temperatures are ignored. The body temperature of a person is either higher or lower in temperature than the ambient temperature. This sensor triggers an alarm only when one sensitive area in the sensor is momentarily of a different temperature than the other sensitive area. Only a temperature difference, over a brief period of time, either higher or lower, acting on only one sensitive area can cause this sensor to generate an electrical warning signal. Thus it is apparent this sensor operates on a differential principle. Even a cold intruder in cold clothing coming indoors in the winter time will cause the sensor to trigger an alarm.

This invention using a 1⅜ inch diameter concave mirror can easily detect a moving person 25 feet away. Larger mirrors will, of course, detect from greater distances.

This invention functions entirely in a passive state. It does not depend on anything but the body heat (temperature) of a moving person to generate its warning signal. There are no ultrasonic sounds, no light beams visible or invisible, no microwaves, no radar waves or any other extraneous external activity or actions taking place to activate this sensor. This sensor is entirely quiescent and undisturbed by anything except a moving person or object. The presence of this sensor can not be detected as it is entirely passive in operation.

A better understanding will become apparent from the following detailed description taken in conjunction with the accompanying drawings, with like reference characters denoting corresponding parts and wherein:

DESCRIPTION OF THE PREFERRED EMBODIMENT

Figure 1:
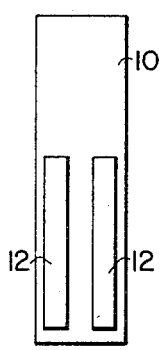
FIG. 1 represents a strip of pyroelectric plastic film with an electrically conductive paint applied to the front surface in the pattern shown.
Figure 2:
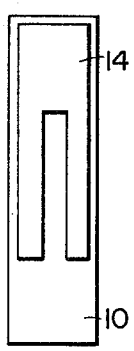
FIG. 2 illustrates the rear surface (reverse surface) of the same piece of plastic film as FIG. 1 with the pattern shown being painted on with electrically conductive paint.
Figure 3:
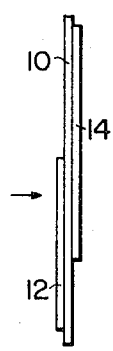
FIG. 3 shows a sectional view of the same plastic film as FIG. 1 and FIG. 2 with the front and the rear surfaces of the film painted with electrically conductive paint. Infra-red energy direction is denoted by the arrow. The thickness of section is shown in exaggerated form for clarity.
Figure 4:
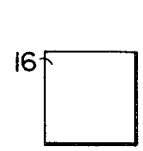
FIG. 4 represents a cube of fine pore plastic rigid foam which will physically support the painted plastic film FIG. 3.
Figure 5:
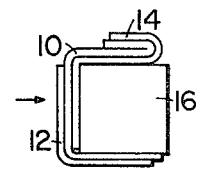
FIG. 5 shows the painted plastic film of FIG. 3 attached to the plastic cube FIG. 4.
Figure 6:
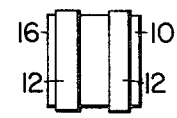
FIG. 6 is a front view of FIG. 5.
Figure 7:
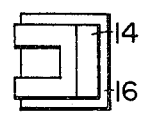
FIG. 7 is a top view of FIG. 5.
Figures 8, 9, 10:
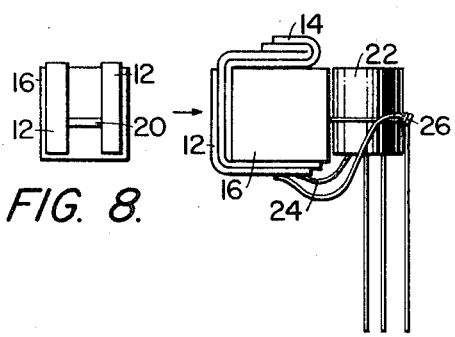
FIG. 8 is a bottom view of FIG. 5.
FIG. 9 is a side view of FIG. 5 integrally attached and connected to a FET transistor.
FIG. 10 is a front view of FIG. 9.

With reference to the drawings, in FIG. 1 number 10 represents a rectangular piece of pyroelectric plastic film of about 6 microns thickness. Upon the front surface of this film two separate stripes 12 of black electrically conductive paint are applied as per the pattern shown. FIG. 2 shows the other side, the reverse side, of the film FIG. 1. Here a u-shaped stripe 14 of black electrically conductive paint is applied per the pattern shown. FIG. 3 shows painted conductive stripes 12 and 14 in sectional view. The drawing shows the conductive paint and the film in exaggerated form for clarity. The arrow points to the section of the film which faces the infra-red energy. In this section the front and rear conductive stripes are "back-to-back" to form a capacitive coupling arrangement. The two regions where the vertical stripes overlap are the sensitive areas. When infra-red energy impinges upon the front stripes, either on one or on both stripes, an electrical voltage is generated in the film by the pyroelectric phenomenon. FIG. 4 represents a small approximately ¼ inch cube of small pore plastic foam 16 such as is used to make "hot and cold" plastic drinking cups. This cube serves as the framework upon which the delicate painted patterned plastic film FIG. 3 is attached by contact cement as shown in FIG. 5. Also in FIG. 5 is shown, on top, a folded over end 14 which is the upper part of the pattern on the plastic film of FIG. 3. The purpose of this folded over arrangement is to bring out to the outer surface the rear electrically conductive paint stripe 14 for a later operation to polarize the plastic film. This is explained further along. FIG. 6 is a front view of FIG. 5 showing the two vertical stripes 12 which face the incoming infra-red energy. FIG. 7 is a top view of FIG. 5 showing the folded over end 14. FIG. 8 is a bottom view of FIG. 5 showing a later applied painted on high megohm resistor 20. This painted on resistor 20 is better understood by reference to FIG. 15 where it is shown to electrically connect the two stripes shown in FIG. 1.

Figure 11:
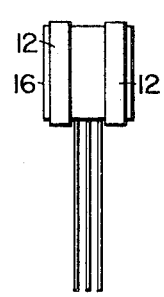
FIG. 11 is a bottom view of FIG. 9.
Figure 12:
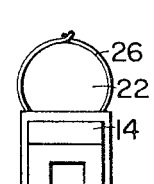
FIG. 12 is a top view of FIG. 9.
Figure 13:
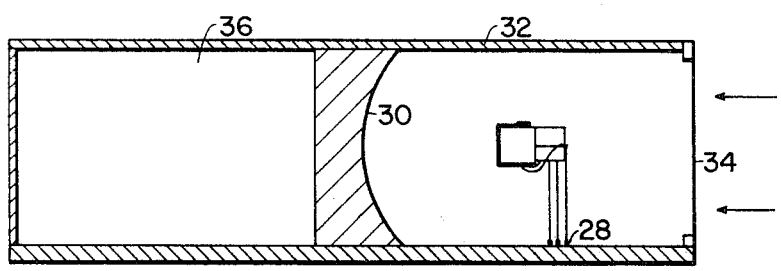
FIG. 13 is a side view of the interior of the apparatus of this invention showing how the film sensor is mounted at the focus of the front surface mirror.
Figure 14:
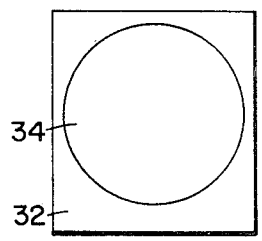
FIG. 14 is a front view of apparatus container showing the window through which the infra-red energy enters.
Figure 15:
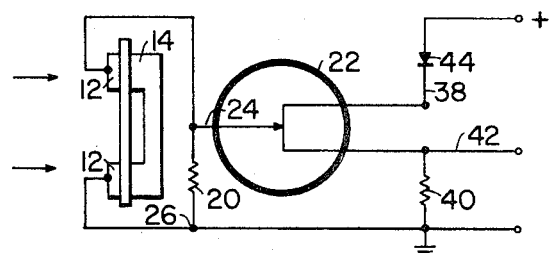
FIG. 15 is a pictorial-diagramatic representation of the plastic film sensor and how it is electrically connected to the integral transistor.

FIG. 9 illustrates the infra-red sensor of FIG. 5 cemented integrally to the flat side of a FET transistor 22 for close proximity and for mounting purposes. The gate lead 24 of the transistor 22 is thus as short as it is physically possible to make it — only about 3/16 inch long. Lead wire 26 is wrapped around the body of the transistor 22 and twisted together to anchor itself in place. One end of this lead wire 26 connects with one of the two front vertical stripes 12 of FIG. 1. The other end of this wire is extended downwards and serves as a connecting wire to the base connector 28 on which the structure shown in FIG. 9 is mounted as can be seen in FIG. 13. Gate lead 24 is connected to the other of the two front vertical stripes 12 of FIG. 1. Both connecting wires 24 and 26 are shown more clearly in FIG. 11 which is a bottom view of FIG. 9. These lead wires are attached to the vertical stripes by electrically conductive cement. FIG. 10 is a front view of FIG. 9 showing the two separated vertical stripes upon which infra-red energy impinges. FIG. 12 is a top view of FIG. 9. FIG. 13 is a side view of the essential apparatus showing the sensor of FIG. 9 mounted at the focus of the front surfaced mirror reflector 30. Infra-red energy enters the container 32 via window 34 which may be made of polyethylene plastic. The housing 32 is essentially air tight to limit any internal air currents. Space 36 is provided for the electronic amplifier. FIG. 14 is a front view of the housing 32 showing the window 34. FIG. 15 is a diagramatic-pictorial illustration for a better and more complete overall understanding of this invention. Note that the two legs of rear painted on stripe 14 of FIG. 2 are bridged on top by a wide band of conductive paint. The conductive paint of stripe 14 is not connected electrically, except during the polarizing operation, to anything except capacitively to stripes 12 where they overlap to form capacitors with film 10 serving as the dielectric. The rear stripes serve basically as capacitors and electrodes and as a conductor to connect the two capacitors in series. The series capacitors formed by the overlapping area of stripes 12 and 14 with the polarized dielectric film 10 therebetween produces zero voltage output on leads 24 and 26 when looking at background radiation over a large angle. Changing ambient produces zero voltage on gate 24 because equal and same polarity voltages are applied to system ground 26 and gate 24 simultaneously. Due to the pyroelectric principle, nonchanging ambient produces no voltage on polarized film. The presence of a moving intruder however, whether hotter or colder than the ambient temperature, will produce an unbalance because the image of this new object will be focused momentarily on one of the two capacitors and a signal will appear across resistor 20. This resistor preferably has a resistance value on the order of $1 \times 10^{12}$ ohms and is conveniently formed by applying a narrow stripe of high resistance conductive paint between stripes 12 at the ends where connections are made to leads 24 and 26. The signal across resistor 20 may be amplified by a field effect transistor and used to actuate alarm circuitry. It has been found that conventional amplifiers do not work well with the above described series capacitor arrangement because the high impedance transducer circuit is subject to electrical interference. Noise spikes always present on the electrical wiring or radiation from power lines produce pulses which appear to the amplifier to be signals generated by the presence of an intruder. Consequently, such a circuit is useless for practical purposes due to frequent false triggering. It has been found that the preamplifier circuitry shown in FIG. 15 eliminates false triggering. This circuit has the input across resistor 20 as described above connected to the gate of field effect transistor 22 through lead 24. The other end of the resistor 20 is connected to system ground through lead 26. The transistor drain is connected to the proper voltage, typically about 6 volts positive, through lead 38. The output of transistor 22 is taken across resistor 40 connected between transistor source lead 42 and ground lead 26. A diode 44 is interposed in drain lead 38 as shown. The function of the diode 44 is to cause the voltage on source lead 42 to swing only towards the positive supply in event of a line transient. This enables the amplifier and switching circuit which follow to differentiate between a moving intruder and a line transient.

From the foregoing it will be apparent that this invention provides for a sensitive and low cost intrusion sensor. Various changes and modifications may be made with regard to the foregoing description without departing from the spirit or the scope of the following claims.

I claim:

1. A pyroelectric differential passive infrared sensor comprising:
   a. a pyroelectric plastic film having front and rear sides,
   b. two front conductive stripes applied to the front side of said film,
   c. a rear conductive stripe applied to the rear side of said film overlapping in part said front conductive stripes defining thereby two heat sensitive capacitors in series with said two front conductive stripes serving as output leads,
   d. said two heat sensitive capacitors being connected to said front conductive stripes in parallel electrically but in series physically and with said electrode on the rear of said film floating electrically.

2. The detector of claim 1 comprising in addition a high value resistor joining said first conductive stripes at their output ends.

3. The detector of claim 1 wherein said pyroelectric plastic film is polyvinylidene fluoride.

4. The detector of claim 1 comprising in addition:
   a. a field effect transistor having gate, source, and drain leads;

b. circuit means connecting one of said first conductive stripes to the gate lead of said field effect transistor; and
c. circuit means connecting the other of said first conductive stripes to the system ground for said field effect transistor.

5. The detector of claim 4 comprising in addition a diode in the drain lead of said field effect transistor whereby the diode causes the voltage on the source lead to swing only towards the positive supply in event of a line transient.

6. The detector of claim 1 comprising in addition:
a. radiation gathering means disposed effective to direct background radiation to said capacitors substantially equally and to direct radiation from a moving intruder to either but not both of said capacitors.

7. The apparatus of claim 6 wherein said radiation gathering means is a concave mirror.

8. The apparatus of claim 6 comprising in addition a sealed housing containing said detector and said radiation gathering means.

9. The apparatus of claim 6 wherein said sealed housing is provided with a window of polyethylene film through which radiation impinges upon said radiation gathering means.

10. The detector of claim 1 comprising in addition:
a. a field effect transistor,
b. a ground wire having one end connected to one of said first conductive stripes and the other end wrapped around said field effect transistor,
c. an insulating spacer block disposed between said film and said field effect transistor, and
d. circuit means connecting the other of said first conductive stripes to the gate of said field effect transistor.

11. A method for the fabrication of infrared detectors comprising:
a. painting conductive stripes on two sides of pyroelectric film to define at least two capacitors,
b. applying a polarizing voltage to said capacitors in parallel, and
c. connecting output leads to like polarity electrodes of said capacitors in series.

* * * * *